3,737,481
IMPROVED PROCESS FOR PREPARING PHOTO-
CHEMICALLY HARDENABLE COMPOSITIONS
COMPRISING A PHOTOSENSITIVE SUBSTANCE
AND AN UNSATURATED POLYESTER
Silvio Vargiu, Ugo Nistri, and Beppino Passalenti, Milan,
Italy, assignors to Societa Italiana Resine S.p.A., Milan,
Italy
No Drawing. Filed June 30, 1971, Ser. No. 165,847
Claims priority, application Italy, July 1, 1970,
26,851/70
Int. Cl. C08f 1/60, 21/02
U.S. Cl. 260—865                                8 Claims

ABSTRACT OF THE DISCLOSURE

There is disclosed a process for preparing an improved photochemically hardenable composition comprising a photosensitive substance and an unsaturated polyester formed by reacting an acrylic or vinyl monomer with the polycondensation product of a polycarboxylic acid and a polyhydric alcohol, wherein prior to mixing the photosensitive substance with the unsaturated polyester, said polyester is first treated with 0.1 to 1.0 part by weight for every 100 parts by weight of said polyester, of an oxide of an alkaline earth metal, at a temperature of from 40 to 70° C., and for a time range of from 0.2 to 3.0 hours.

---

The present invention relates to compositions of photochemically hardenable unsaturated polyesters, and the relative process for their manufacture.

Unsaturated polyesters are combinations of unsaturated monomers of the acrylic or vinyl type with products which are obtained by polycondensing polycarboxylic acids and polyhydric alcohols when unsaturation is present in one or other class of compounds.

It is already known in the prior art as possible photochemically to polymerise unsaturated monomers or combinations thereof with unsaturated polymers in the presence of substances which decompose under the action of light, particularly ultra-violet light.

Of the photosensitive substances which may be used for the said purposes it is possible to mention: benzoin and derivatives, organic disulphides, benzyl and organic sulphonyl chlorides, chlorides or organic acids and halogenated polycyclic hydrocarbons.

Such substances are not however completely satisfactory in the photochemical hardening of unsaturated polyesters.

In fact, in order to obtain hardened product which have satisfactory characteristics, it is necessary to use the photosensitive compound in relatively large quantities and/or to carry out setting at high temperatures.

All this is particularly disadvantageous insofar as the photosensitive compounds are expensive, furthermore hardening with the additional effect of heat involves a loss of those advantages which are peculiar to photochemical hardening. It has now been found that the aforesaid drawbacks can be eliminated by applying the method of the present invention which consists essentially in treating the unsaturated polyesters with small quantities of metallic oxide prior to photochemical hardening.

More particularly, according to the present invention, compositions comprising unsaturated polyesters and one or more photosensitive substances including those previously defined, in which the unsaturated polyesters have been previously treated at temperatures above ambient temperature and for times which will be defined hereinafter, are subject to irradiation, particularly by means of ultra-violet light, in the presence of metallic oxides and particularly alkaline earth metal oxides.

By proceeding with quantities of such oxides ranging from 0.1 to 1.0 parts by weight for every 100 parts by weight of the unsaturated polyester, the advantages of complete setting in short periods of time are obtained without the provision of heat from outside sources.

Furthermore, it is possible to reduce the quantity of photosensitive compound to a very small level, in any case less than the amounts normally used in the prior art.

Useful for the purpose of the present invention are the unsaturated polyesters which, as stated hereinabove, are constituted by a monomer of the acrylic or vinyl type, in combination with the product of polycondensation obtained from polycarboxylic acids and polyhydric alcohols when unsaturation is present in one or other class of compounds.

Normally used are aryl vinyl compounds, and particularly styrene, in combination with the products of polycondensation of saturated dihydric alcohols and unsaturated dicarboxylic acids, such as for example maleic, fumaric, itaconic and citraconic acids.

Also useful for the purposes of the present invention are the modified products which are obtained by addition in polycondensation of lesser quantities of monocarboxylic acids or monohydric alcohols, or acids having more than two carboxyl groups per molecule or alcohols having more than two hydroxyl groups per molecule.

Finally, the unsaturated carboxylic acid listed above can be partially substituted by equivalent quantities of saturated carboxylic acids such as for example succinic, adipic, azelaic or phthalic acids.

In the unsaturated polyester, the quantity of acrylic or vinyl monomer is preferably comprised between 20 and 70% by weight of product of polycondensation.

This latter should furthermore have an acidity number of between 35 and 45 and a viscosity between T and U, this value being determined on the Gardner scale in a solution of 66% by weight of styrene.

Such characteristics features can be obtained by measuring the relative quantities of monomers and by regulating the conditions of polycondensation.

The unsaturated polyesters are treated according to the process of the present invention with oxides of alkaline earth metals and preferably with magnesium oxide in quantities of 0.1 to 1.0 parts by weight to every 100 parts by weight of polyester.

More precisely, the treatment takes place at temperatures of 40 to 70° C. and for periods ranging from 0.2 to 3.0 hours.

In practice, the metallic oxide is added in the quantities stated to the unsaturated polyester and the mixture is maintained in the aforesaid range of temperature until it becomes clear. We consider that the metallic oxide becomes in some way bonded to the unsaturated polyester by the treatment described. It has in fact been observed that the simple addition of the oxide to the unsaturated polyester does not result in any of the advantages of the present invention.

The photosensitive compounds which are useful for the purposes of the present invention are those commonly used in the art such as benzoin, its alkyl derivatives which have in the alpha position an alkyl group containing from 1 to 8 carbon atoms and its etherified derivatives: alkyl disulphides and particularly dibenzyl disulphide; benzyl and organic sulphonyl chlorides, particularly paratoluene sulphonyl chloride and naphthalene sulphonyl chloride; the chlorides of organic acids; the halogenated polycyclic hydrocarbons and the aromatic type polyaldehydes.

By means of treatment with the oxides of the earth alkaline metals and preferably magnesium oxide, in the quantities which have been set out hereinabove, it is possible to achieve complete and rapid hardening of unsaturated polyesters by irradiation with light, particularly with a wavelength of 2500 to 4000 A., using one or more photosensitive compounds in quantities not exceeding 2% by weight and preferably not exceeding 1.5% by weight.

It has been found that optimum levels of concentration for the photosensitive compound are those of between 0.1 and 1.5% by weight, in that in this way the best conditions are achieved when bearing in mind on the one hand the rate of hardening of the unsaturated polyesters and on the other the quantity of photosensitive compound used.

Obviously it is possible to work with levels of concentration above those mentioned, such as for example up to 5% by weight, but this has the disadvantage of using rather considerable quantities of photosensitive compounds.

In the hardening of unsaturated polyesters which have been previously treated with the oxides of earth alkaline metals in quantities and under conditions as previously defined, the sensitivity of those substances which are capable of triggering off radical polymerisation under the influence of radiation, particularly of ultra-violet light, seems to be increased.

The advantages of this method of procedure are thus obvious, as can be seen from the following experimental examples, in that it is possible to achieve a high rate of hardening of unsaturated polyesters with the formation of perfectly hardened products, by using small quantities of photosensitive compounds.

EXAMPLE 1

Phthalic anhydride, maleic and propylene glycol in a molar ratio of 1:1.25:2.42 are introduced into a glass vessel fitted with an agitator, thermometer and inert gas injection system. The temperature is gradually raised to 185 to 200° C. and the flask maintained under these conditions until a product is obtained which has a Gardner viscosity of U-V (measured in solution of 66% styrene) and an acidity number of 45 to 50.

Then the mixture is cooled and diluted with styrene containing 20 p.p.m. and 30 p.p.m. para-tertiary butyl catechol. In particular, styrene is added to maintain the polycondensation product at approx. 100° C. Finally, it is cooled to ambient temperature and the viscosity adjusted to 1200 to 1300 cps. The gel time is furthermore raised to 8 to 10 minutes.

The viscosity was determined at 25° C. using a Gardner viscosimeter and Hubbelhode viscosimeter.

Furthermore, in order to check the gel time, the following method was used: to 100 g. unsaturated polyester resin are added 0.2 ml. 6% cobalt octoate solution. These constituents are mixed and the temperature in the thermostatically controlled bath raised to 25° C.

Then 1.5 ml. methyl ethyl ketone peroxide (50%) were added, the mixture rapidly homogenised and measurement of the time commenced. Progress of viscosity was followed by means of a glass rod every 30 to 60 seconds. The gel time is described as that period of time which elapses from homogenisation of the mixture with peroxide to the moment when the resin lifted with the rod clings to the glass thereof.

EXAMPLE 2

The unsaturated polyester obtained as described in the first example is heated to 50 to 55° C. and magnesium oxide is added in quantities equal to 0.5 part by weight to every 100 parts by weight of polyester. The mixture is maintained at the aforesaid temperature for 30 minutes; thus, a clear mass is obtained.

Then, the mixture is cooled to 25 to 30° C. and 0.5 part by weight to every 100 parts by weight of polyester, of photosensitive substance are added, this being constituted by the aromatic polyaldehyde known under the commercial name "Trigonal UV."

The mixture is homogenised and 8 parts by weight of a paraffin wax with a melting point of 52 to 53° C. are added for every 100 parts by weight of unsaturated polyester.

The composition thus obtained is spread out on a glass measuring 8 x 17 cm., in the form of a film 200 microns thick. After being left in the air for ten minutes, the sheet of glass is placed in a tunnel and exposed for 5 minutes to irradiation from an Osram L 40 to W 73 40 watt lamp.

In particular, a distance equal to 10 cm. was maintained between the source of radiation and the film.

After irradiation, the film was allowed to cool to ambient temperature for 10 minutes after which the hardness was determined by means of a Koenig pendulum.

For this purpose, the sheet of glass is placed in the appropriate seating and the pendulum dropped.

When the oscillation drops to position 3, counting of the seconds commences.

The hardness is determined again after 24 hours and after 7 days from irradiation.

The following results were obtained: hardness A Koenig after 10 minutes: 70", after 24 hours: 108", after 7 days: 128".

At the same time, an entirely identical test was carried out, identical that is except for the absence of any treatment with magnesium oxide. The results of this test were as follows: hardness A Koenig after 10 minutes: 50", after 24 hours: 82", after 7 days: 105".

EXAMPLE 3

The same procedure as described in Example 2 was used, with 1 part by weight of benzoin and 0.5 part by weight magnesium oxide for every 100 parts by weight of the unsaturated polyester described in the first example.

The following results were obtained: hardness A Koenig after 10 minutes: 65", after 24 hours: 90".

Parallel with this, an entirely identical test was carried out, but with no treatment with magnesium oxide. The results were as follows: hardness A Koenig after 10 minutes, 26"; after 24 hours, 64".

EXAMPLE 4

The same procedure was adopted as described in Example 2, using 1.5 parts by weight benzoin and 0.3 part by weight magnesium oxide to every 100 parts by weight of the unsaturated polyester described in the first example.

The following results were obtained: hardness A Koenig after 10 minutes: 56", after 24 hours: 77", after 7 days: 115". At the same time, an entirely identical test was carried out, but with no treatment with magnesium oxide.

The results were as follows: hardness A Koening after 10 minutes: 41", after 24 hours: 68", after 7 days: 110".

EXAMPLE 5

The same procedure was adopted as described in Example 2, using 0.5 part by weight magnesium oxide and 1 part by weight naphthalene sulphonyl chloride for every 100 parts by weight of the unsaturated polyester described in the first example.

The following results were obtained: hardness A Koening after 10 minutes: 83", after 24 hours: 109", after 7 days: 115".

When the magnesium oxide was reduced to 0.2 part by weight for every 100 parts by weight of unsaturated polyester, all the other conditions being maintained constant, the results were as follows: hardness A Koening after 10 minutes: 65", after 24 hours: 96", after 7 days: 110".

In parallel, a test was carried out in which magnesium oxide was excluded and 2 parts by weight naphthalene sulphonyl chloride were used for every 100 parts by weight of unsaturated polyester.

Thus, the following results were obtained: hardness A Koening after 10 minutes: 64″ after 24 hours: 80″, after 7 days: 96″.

We claim:

1. In a process for the preparation of photochemically hardenable compositions, which comprise an organic photosensitive substance which decomposes upon exposure to radiation and an unsaturated polyester, which comprises combining an aryl vinyl monomer with the product of a polycondensation reaction of a polycarboxylic acid and a polyhydric alcohol, when unsaturation is present in one or the other thereof, the improvement which comprises:

mixing said unsaturated polyester at a point in time prior to its admixture with said photosensitive substance, with 0.1 to 1.0 parts by weight per 100 parts by weight of said polyester, of an oxide of an alkaline earth metal, at a temperature of from 40 to 70° C., and for a time ranging from 0.2 to 3.0 hours, said photosensitive substance being employed in an amount of from 0.1 to 1.5 percent by weight in said photochemically hardenable composition.

2. The process of claim 1, wherein said alkaline earth metal oxide is magnesium oxide.

3. The process of claim 1, wherein said aryl vinyl compound is employed in an amount of from 20 to 70 percent by weight with respect to the polycondensation product.

4. The process of claim 1, wherein said polycondensation product exhibits an acidity value of 35 to 45.

5. The process of claim 1, wherein said photosensitive substance is a member selected from the group consisting of benzoin and its alkyl derivatives having in the alpha position, an alkyl group of from 1 to 8 carbon atoms and its etherified derivatives; alkyl disulfides; benzyl and organic sulphonyl chlorides; organic acid chlorides; halogenated polycyclic hydrocarbons; and aromatic polyaldehydes.

6. The process of claim 5, wherein said alkyl disulfide is dibenzyl disulfide.

7. The process of claim 5, wherein said organic sulphonyl chloride is a member selected from the group consisting of para-toluene sulfonyl chloride and naphthalene sulfonyl chloride.

8. The process of claim 1, wherein said aryl vinyl compound is styrene.

References Cited

UNITED STATES PATENTS

| | | | |
|---|---|---|---|
| 2,628,209 | 2/1953 | Fisk | 260—865 |
| 3,631,217 | 12/1971 | Rabenold | 260—865 |
| 3,582,487 | 6/1971 | Fuhr et al. | 204—159.15 |
| 3,627,657 | 12/1971 | Nistri et al. | 204—159.15 |
| 3,538,188 | 11/1970 | Fekete et al. | 260—865 |
| 3,556,791 | 1/1971 | Suzuki et al. | 260—861 |
| 3,616,366 | 10/1971 | Passalenti et al. | 260—865 |

FOREIGN PATENTS

| | | | |
|---|---|---|---|
| 1,017,050 | 1/1966 | Great Britain | 260—865 |
| 1,190,907 | 5/1970 | Great Britain | 260—865 |

WILLIAM H. SHORT, Primary Examiner

E. WOODBERRY, Assistant Examiner

U.S. Cl. X.R.

204—159.15, 159.19; 260—40 R, 45.7 R, 873